(12) United States Patent
Loh et al.

(10) Patent No.: US 9,299,311 B2
(45) Date of Patent: Mar. 29, 2016

(54) DISABLING A DISPLAY REFRESH PROCESS

(75) Inventors: Sze Hau Loh, Cypress, TX (US); Theodore F. Emerson, Tomball, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 430 days.

(21) Appl. No.: 13/582,894

(22) PCT Filed: May 28, 2010

(86) PCT No.: PCT/US2010/036654
§ 371 (c)(1),
(2), (4) Date: Sep. 5, 2012

(87) PCT Pub. No.: WO2011/149480
PCT Pub. Date: Dec. 1, 2011

(65) Prior Publication Data
US 2012/0327094 A1    Dec. 27, 2012

(51) Int. Cl.
*G06F 13/14* (2006.01)
*G09G 5/00* (2006.01)

(52) U.S. Cl.
CPC .......... *G09G 5/003* (2013.01); *G09G 2330/022* (2013.01); *G09G 2370/042* (2013.01)

(58) Field of Classification Search
None
See application file for complete search history.

(56) References Cited

U.S. PATENT DOCUMENTS

| | | | |
|---|---|---|---|
| 5,757,365 A | 5/1998 | Ho | |
| 6,072,465 A | 6/2000 | Maeda et al. | |
| 6,600,747 B1 | 7/2003 | Sauber | |
| 6,774,904 B2 | 8/2004 | Emerson et al. | |
| 7,400,097 B2 | 7/2008 | Maede et al. | |
| 2004/0128358 A1 | 7/2004 | Apfel et al. | |
| 2004/0212610 A1* | 10/2004 | Hamlin | 345/211 |
| 2004/0222941 A1 | 11/2004 | Wong et al. | |
| 2006/0005002 A1* | 1/2006 | Zimmer et al. | 713/1 |
| 2007/0086475 A1* | 4/2007 | Clemens et al. | 370/458 |
| 2007/0103477 A1 | 5/2007 | Paquette et al. | |
| 2007/0115290 A1 | 5/2007 | Polzin et al. | |
| 2007/0296643 A1* | 12/2007 | Ben-Shachar et al. | 345/1.1 |
| 2008/0001934 A1 | 1/2008 | Wyatt | |
| 2009/0141045 A1* | 6/2009 | Jackson | 345/649 |

(Continued)

FOREIGN PATENT DOCUMENTS

| | | |
|---|---|---|
| CN | 1893648 | 1/2007 |
| KR | 100890841 | 3/2009 |

OTHER PUBLICATIONS

International Searching Authority, The International Search Report and the Written Opinion, Feb. 28, 2011, 8 pages.

*Primary Examiner* — Yingchun He
(74) *Attorney, Agent, or Firm* — Van Cott, Bagley, Cornwall & McCarthy PC

(57) ABSTRACT

A method performed by a physical computing system, the method includes disabling a display refresh process of a video controller (202) of the physical computing system if no active display device is connected to the physical computing system. A physical computing system includes a video controller (202) comprising a rendering engine (204) and a display refresh controller (206); a memory controller (212) connected to a memory (214); and a display controller (310) to determine whether an active display device is connected to the physical computing system; in which a display refresh process performed by the display refresh controller (206) is disabled when no active display device is connected to the physical computing system.

19 Claims, 5 Drawing Sheets

(56) References Cited

U.S. PATENT DOCUMENTS

| | | | |
|---|---|---|---|
| 2009/0225062 A1* | 9/2009 | Naik et al. | 345/204 |
| 2009/0326730 A1 | 12/2009 | Bjeljac et al. | |
| 2010/0123727 A1 | 5/2010 | Kwa et al. | |

* cited by examiner

DISABLING A DISPLAY REFRESH PROCESS

BACKGROUND

A video controller is a piece of hardware dedicated to processing graphics for display onto a display device such as a monitor. The video controller provides a video feed to the display device. A video feed includes data which is in a format able to be readily used by the display device to display the appropriate images. In order to produce a persistent and stable image on the display device, the video controller must scan the contents of the frame buffer from the memory subsystem of the video controller several times per second. This process consumes a large amount of memory bandwidth. Bandwidth refers to the amount of data able to be transferred to and from the memory within a specified period of time. Addition this process consumes a lot of power.

The video controller functionality can affect the performance of systems in which the video controller is integrated with other system components for the purpose of sharing memory and reducing costs. For example, in many server systems where high performance graphic rendering is not required, the video controller can be integrated with another hardware device such as a management controller. A management controller is a hardware/software subsystem used to perform hardware-based management on a server system. When the memory used by the video controller is also used for other purposes, the video controller unnecessarily consumes memory bandwidth when no active display devices are connected to the server system.

A constant video display is not necessary for many server systems such as those used for network routing and data storage purposes. During normal operation of such systems, the servers perform their appropriate computing tasks without any direct human interaction. Human interaction with such server systems is generally limited to a system administrator. The system administrator may only occasionally interact with the server for various maintenance purposes. Consequently, generating a video output during normal operation when no display is being used unnecessarily consumes power. Furthermore, if the video controller is integrated with another system device such as a management processor, than the video controller unnecessarily consumes memory bandwidth. This unnecessary consumption of memory bandwidth and power causes the system utilizing the video controller to operate at less than optimal performance.

BRIEF DESCRIPTION OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

Figure 1:
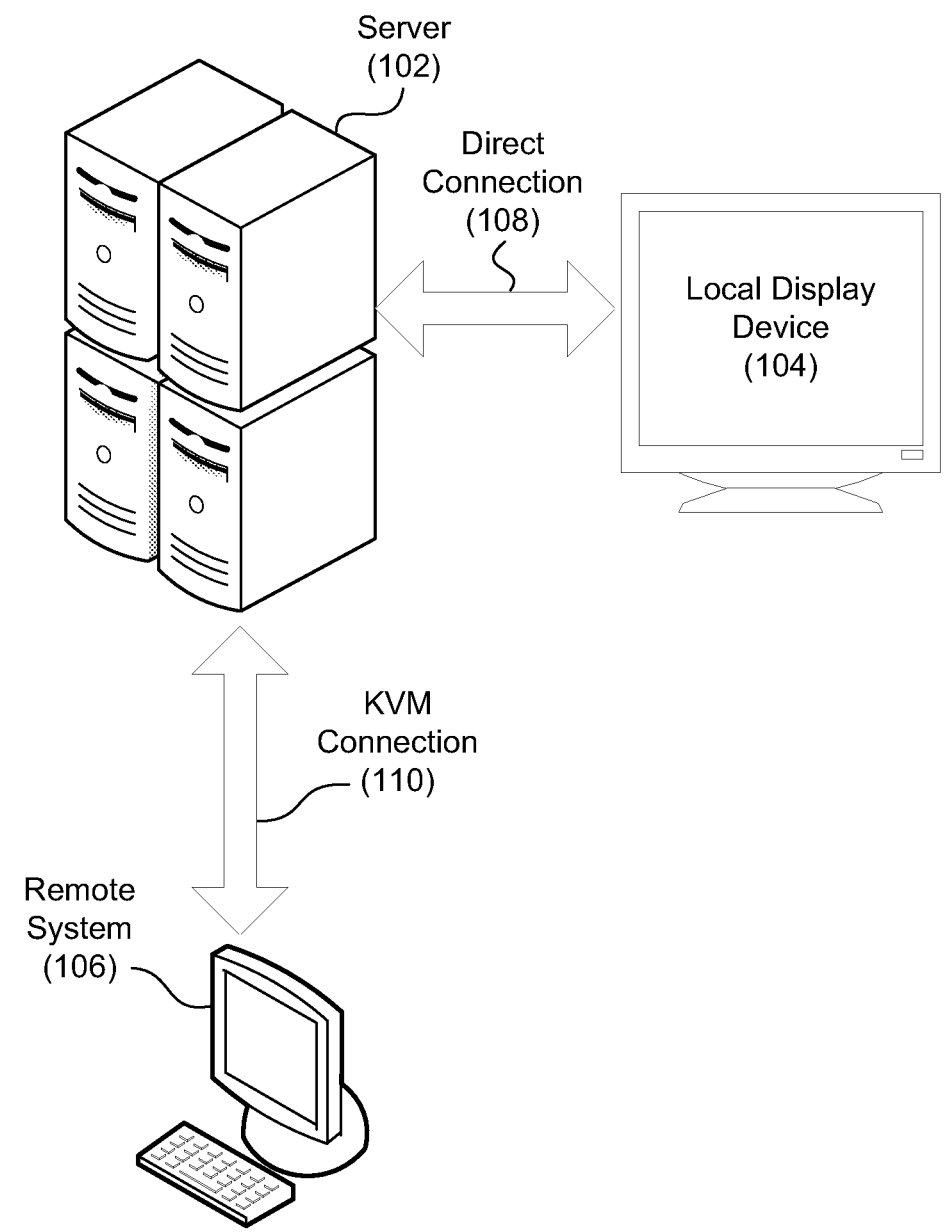
FIG. 1 is a diagram showing illustrative server display methods, according to one example of principles described herein.

As mentioned above, a constant video output is not necessary for many server systems such as those used for network routing and data storage purposes. During normal operation of such systems, the servers perform their appropriate computing tasks without any direct human interaction. Human interaction with such server systems is generally limited to a system administrator. The system administrator may only occasionally interact with the server for various maintenance purposes. Consequently, generating a video output during normal operation when no display is being used unnecessarily consumes power. Furthermore, if the video controller is integrated with another system device such as a management processor, then the video controller unnecessarily consumes memory bandwidth. This unnecessary consumption of memory bandwidth and power causes the system utilizing the video controller to operate at less than optimal performance.

Some solutions to shutting down a video controller when it is not in use involve the operating system of the server. Generally, the operating system works in concert with a video controller driver to transition the video controller into as low power state after a predetermined period of inactivity. However, this approach requires vendor specific software to interact with the video controller in this manner. Furthermore, when the display is needed, the video controller must go through a startup process to become functional again. This process can be complicated and may not be possible if the operating system is in a degraded or unavailable state.

In light of this and other issues, the present specification discloses a method and system for shutting down the display refresh process performed by the refresh display controller of a video controller when no display device is present. As the display refresh process is the primary consumer of memory bandwidth on many shared memory systems, more memory bandwidth is made available to other consumers of the memory when the refresh display controller stops making memory requests to the frame buffer within that memory.

According to certain illustrative examples, display device presence signals are sent from the display plugs to a display controller. The display controller then signals the video controller to disable the display refresh controller if no active display devices are connected to the system. The video controller can maintain its rendering function while the display refresh controller is disabled. Additionally, if a display device is connected or made active, the display controller can enable the display refresh process. As the rendering function of the video controller is never slut down, the video controller will readily continue operations when the display refresh process is once again enabled.

Through use of a method or system embodying principles described herein, the display refresh process of a video controller can be shut down as opposed to shutting down the entire video controller. By shutting down a display refresh process, more memory bandwidth is available for other components using the same memory as the display refresh controller. Furthermore, the operation of the video controller can be readily continued when the display refresh process is once again enabled as a result of a display device being connected or made active. Shutting down the display refresh process also reduces the overall power consumption of the memory subsystem. Furthermore, no interaction with the operating system is required. Consequently, a system embodying principles described herein can be designed and implemented without regard to which operating system will be used. Additionally, no vendor specific software is needed to perform the operations described herein.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an embodiment" "an example" or similar language mea that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

Throughout this specification and in the appended claims, the term "active display device" refers to a device such as a monitor which is powered on and in a state able to receive a video feed from the physical computing system to which it is connected. An "external" display device refers to one which is connected directly a physical computing system. An "internal" display device refers to a device which receives a video feed. One example of an internal device is Keyboard Video Mouse (KVM) video redirection hardware.

Referring now to the figures, FIG. 1 is a diagram showing illustrative server display methods (100). According to certain illustrative examples, a server (102) can display content on a local display device (104). Additionally or alternatively, the server (102) can display content on a remote display device by transmitting a video feed over a network via a Keyboard Video Mouse (KVM) connection.

As mentioned above, many server systems are used for network routing and data storage purposes. As such, they do not require consistent human interaction. Human interaction generally occurs wen a system administrator performs various maintenance and upgrade tasks on the server system. During normal operation, no active display device is connected to the server system. When the system administrator needs to interact with the server, a display device can be connected to the server system, in some cases, a display device may maintain connection with the server. However, the display device may be deactivated when it is not being used and reactivated when it is next used.

A system administrator can interact with the server through a variety of methods. One such method is to connect a local display device (104) to the server (102) via direct connection (108). Example interfaces for direct connection (108) include, but are not limited to, analog Video Graphics Array (VGA), Digital Video interface (DVI), High Definition Multimedia Interface (HDMI), and DisplayPort. The server can include a standard display plug consistent with the desired interface to allow a display device to connect to the server (102).

Additionally or alternatively, a system administrator may access the server (10) from a remote system (108). In this case, the input signals from devices such as a keyboard and mouse are transmitted over a data network to the server (102). The video feed from the video controller of the server (102) is received by KVM hardware of the server (102). The KVM hardware packages the data into a format suitable for transport over a data network this can allow the administrator access as if he or she were connected directly to the server (102). This type of connection is referred to as a KVM connection (110).

As mentioned above, during normal operation of a server (102), continual human interaction is not needed. Consequently, any active display devices may either be made inactive (turned off) or disconnected. In many servers, when no active display device is connected, the video controller still maintains functionality. This unnecessarily causes the memory to consume power. In the case that the video controller is integrated with another system such as a management controller, the performance of the management controller is unnecessarily less than optimal because the video controller will unnecessarily consume bandwidth. On some server systems, the operating system powers down the video controller. However, this requires the video controller to go through a wake up process when it is once again needed. If the operating system is in a degraded or unavailable state, the video controller may not be able to be reawakened without restarting the entire computing system.

Figure 2:
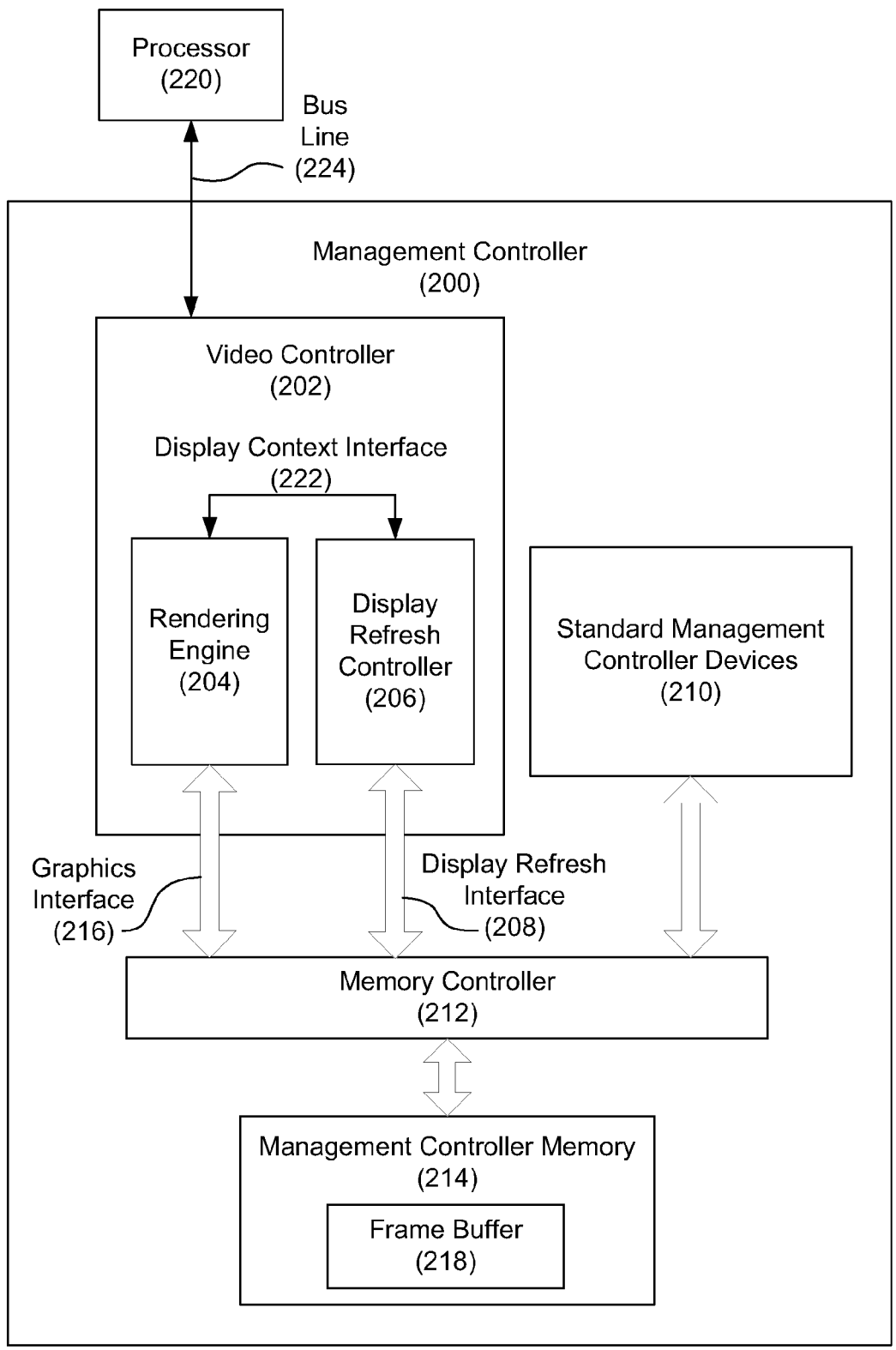
FIG. 2 is a diagram showing illustrative components of a management controller, according to one example of principles described herein.

FIG. 2 is a diagram showing illustrative components of a management controller (200). According to certain illustrative examples, a video controller (202) is integrated onto a management controller (200). As mentioned above, a management controller is a hardware/software subsystem used to perform hardware-based management on a server system. For example, the management controller (200) can manage the power settings and monitor the temperatures of the components of the motherboard. It can also be used for more advanced services such as console and device redirection. The management controller (200) includes a memory system which is shared by several components of the management controller (200) including the video controller (202).

Integrating the video controller (202) with a management controller (200) allows the video controller (202) and the management controller (200) to share the same memory (214) component. The sharing of a memory (214) component allows for the system to be implemented at a lower cost. The manner in which the management controller memory (214) can be partitioned for video use will be described below in the text accompanying FIG. 4.

A video controller (202) includes, among other devices, a rendering engine (204) and a display refresh controller (206). The rendering engine (204) receives data to be rendered from a bus line (224) connected between a processor (220) and the video controller (202). A video controller driver is used to send the data to the rendering engine (204) of the video controller (202). A video controller driver is a piece of software designed to interact with the hardware of the video controller (202). In some cases, the video controller driver is executed on a processor (220) of the physical computing system utilizing the video controller (202), in some cases, the video controller driver is executed by an on-board processor of the management controller (200).

The data from the video controller driver is then rendered by the rendering engine (204) into a format suitable for display on a display device such as a monitor. The rendered data is then pieced into a frame buffer (218) of the management controller memory (214) via the graphics interface (216) and the memory controller (212). The frame buffer (218) is periodically updated by the rendering engine (204) as the image changes according to the video data. As each update generally includes small chances to the data in the frame buffer, this process consumes a relatively small amount of memory bandwidth. The video controller also includes a display context interface (222) to communicate data between the rendering engine and the display refresh controller.

As mentioned above, in order to produce a stable image on a display, the display refresh controller (208) scans the entire contents of the frame buffer (218) several limes per second through the display refresh interface (208). Because the display refresh controller (206) must scan the entire contents of the frame buffer rather than just the updated portion of the frame buffer, a relatively large amount of memory bandwidth is consumed. Furthermore, priority must be given to this process as any latency in the refresh process will result in glitches on the display.

According to certain illustrative examples, when no active display is connected to the physical computing system utilizing the management controller (200), the display refresh process is disabled. This will stop the display refresh controller (206) from scanning the contents of the frame buffer (218). The rendering engine (204) may still maintain its functionality despite the disabling of the display refresh controller (206). In some cases, all outstanding requests from memory requests are completed before the display refresh process is disabled. The disabling of the display refresh process may also be performed at a frame boundary. This provides a smoother display refresh process shutdown and prevents the memory controller from malfunctioning while it continues to service other requestors.

In some cases, the operating; system utilizing the video controller (202) is unaware of the disabling of the display refresh process. Consequently, disabling this process does not require interaction with the operating system. This allows a system embodying principles described herein to be designed and implemented without regard to which operating system will manage a system utilizing the management controller (200).

With the display refresh controller (206) no longer consuming a large amount of memory bandwidth, a fair portion of memory bandwidth can be redirected to various other devices (210) associated with the management controller (200). Furthermore, the lighter bandwidth demand pieced on the memory controller (212) results in reduced power consumption. Additionally, when a display device is connected to the physical computing system utilizing the management controller (200), the display refresh process may simply be enabled. The video feed will than be provided to the display device as if the display refresh process of the video controller (202) never ceased.

Figure 3:
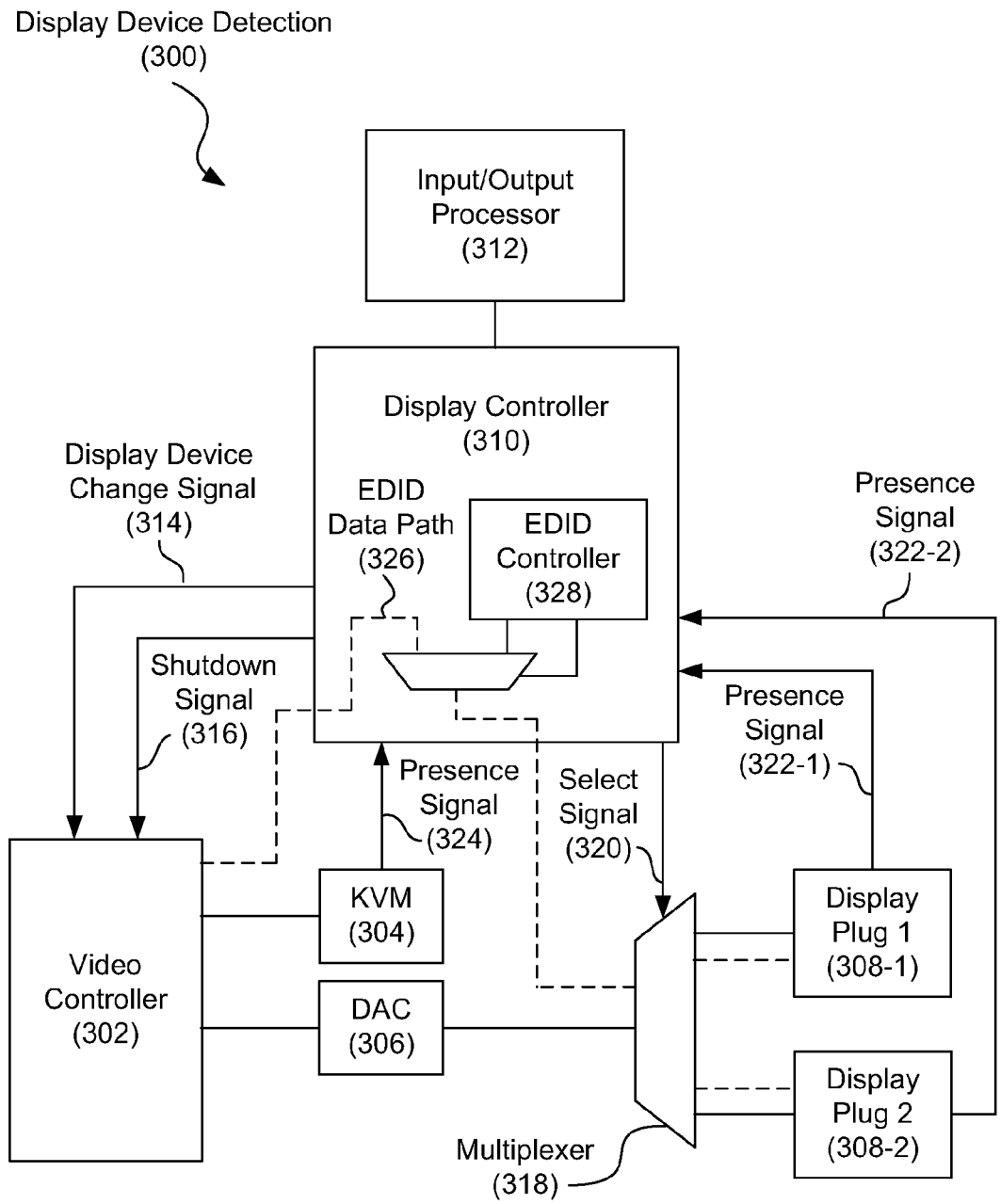
FIG. 3 is a diagram showing illustrative components used for display device detection, according to one example of principles described herein.

FIG. 3 is a diagram showing illustrative components used for display device detection. According to certain illustrative examples, a display controller (310) is used to detect active display devices connected to the physical computing system utilizing the display controller (310), in some cases, the display controller (310) includes simple hardware for detecting display devices and switching a multiplexer (318) to route a video feed accordingly. In some cases, the display controller utilizes an Input/Output Processor (IOP) (312) to further validate the presence of display devices and provide the video controller (302) with additional information regarding the capabilities of the display devices.

The process of connecting a display device to a physical computing system while the physical computing system is already powered on is referred to as a "hot-plug." In the case that the display controller (310) uses only simple hardware, when a hot-plug occurs, the display plug (308) can inform a display controller (310) of its connection through a presence signal (322). The presence signal is generated in response to detection of a display device through a detection mechanism. A detection mechanism may include, but is not limited to, detection of display signal grounds, detection of display signal terminations and detection of dedicated presence signals.

The display controller (310) can include a de-bouncing circuit. As a display device is being connected to a display plug, "bouncing" occurs as the display device connector is wiggled into the display plug. Bouncing refers to the intermittent connections which occur as the display device connector is being inserted into the display plug (308). The de-bouncing circuit eliminates the bouncing effect by waiting until a connection is detected for a specified period of time. As mentioned above, in some cases, the connection is detected by measuring the terminal resistance of the display plug (308), in some examples, the connection can be detected by sampling the signal from one of the pins of the display plug (308).

In some cases, a video controller (302) is designed to only output one video feed. However, some physical computing systems include more than one display plug (308). In this case, the display controller (310) can send a select signal (320) to a multiplexer (318) to switch a video feed from the video controller to the proper display plug (308). For example, if a display device is connected to display plug 1 (308-1), then the display plug 1 (308-1 will send a presence signal (322-1) to the display controller (310). This presence signal (3224) will cause the display controller (310) to use the select signal (320) to cause the multiplexer (318) to switch the video feed to display plug 1 (308-1). Likewise, if a display device is connected to display plug 2 (308-2), then the display plug 1 (308-2) will send a presence signal (322-2) to the display controller (310). This presence signal (322-2) will cause the display controller (310) to use the select signal (320) to cause the multiplexer (318) to switch the video feed to display plug 2 (308-2). This allows both display plugs (308) to receive a video feed from the video controller (302) through the same Digital-to-Analog Converter (DAC) (306), eliminating the need for a second DAC. Having fewer DACs reduces both hardware cost and power consumption.

In the case that a physical computing system includes more than one display plug and multiple displays are connected, the video controller (302) can display either a duplicate image or a different image on each display device if the hardware allows. The manner in which the video feed is distributed between displays can be done by the display controller (310) without intervention from the operating system of the physical computing system.

Some display devices include means for communicating data related to the display device to a video controller (302). This allows the video controller (302) to at its settings of the output video feed to achieve optimal display results. For example, when the display controller (310) receives a presence signal (322) from the display plug (308), the display controller (310) informs the video controller (302) of the change in display device status via display device change signal (314). The video controller can then validate the presence of the display device by submitting an Electronic Display Identification Data (EDID) interrogation request. This interrogation request can be performed directly by the video controller (302) or through driver software running on the main processor (e.g. 220, FIG. 2) This request can be sent though an EDID data path (326) connected between the video controller (302) and a display plug (308). The EDID data path (326) is under the control of an EDID controller (328) of the display controller (310). The END controller (326) can be configured to allow data to flow directly from the video controller (302) and a display plug (308). Additionally or alternatively, the EDID controller (328) can operate under the control of the IOP (312). This allows the IOP (312) to perform its own interrogation of the device connected to the display plug (308). One example of an END data path is a Display Data Channel (DDC).

If the display device is capable, it can then return EDID data to the video controller, EDID data describes the capabilities of the display device such as filter type, display size, timing information etc. This data informs the video controller (302) how best to render images for optimal display on the display device. Additionally, receipt of the EDID data by the video controller (302) confirms the presence of the display device.

In the case that an attached display device is a analog display device, the video controller (302) may send the signal through the DAC (306) before it is sent to the display plug (308) through the multiplexer (318). According to certain illustrative examples, if the display refresh controller IS disabled, the management controller associated with the video controller (302) can cause the DAC (306) to go into a low power state. Upon enabling the display refresh controller, the DAC may be brought back into a fully powered state. Having the DAC (306) in a low powered state when the display refresh controller is disabled allows the system to consume less power.

As mentioned above, a video controller (302) can provide a video feed to an internal display device. Doing so allows the video feed to be transmitted to a remote location over a data network via a KVM session. If a session is requested, the KVM hardware (304) sends a presence signal (324) to the display controller (10). The display controller (10) can then indicate to the video controller (302) that a KVM session is requested. The video controller will then send the video feed to the KVM hardware (306) in a similar manner in which the video feed is sent to the DAC (308).

If the display controller (310) detects no active display devices from the display plugs (308) or the KVM hardware (3041) then the display controller can instruct the video controller (302) to disable the display refresh process via a shutdown signal (318). It may be the case that a display device is plugged into one of the display plugs. However, if the display device is powered off, then the display controller interprets the display device as being inactive. When a display device is made active or connected to a display plug (308), then the display controller (310) can inform the video controller to enable the display refresh process. Additionally or alternatively, if the display controller (310) detects a KVM session request, then the display controller (310) can instruct the video controller (302) to enable the display refresh process. In one example, the video controller may enable the display refresh process by negating the shutdown signal (316).

In one case, the display controller (310) can be configured to generate the display device change signal (314), the shutdown signal (316) and select signal (320), using a predetermined policy. For example, if a display device is connected to both display plugs (308), then, the display controller (310) may grant priority to one display plug (308) over the other, in some cases, the input/output processor (312) may interact with the input/output signals of the display controller (310) to override this predetermined policy. For example, the input/output processor, with its additional processing capabilities, may use additional information, such as an administrator policy setting, to generate the control signals consistent with the amended policy. The input/output processor may also use additional information it has available to make a more accurate determination of the presence of any attached display devices. This may include, for example, further validating the presence signal (322) with its own interrogation request to the attached device through the FDIC) controller (328).

Figure 4:
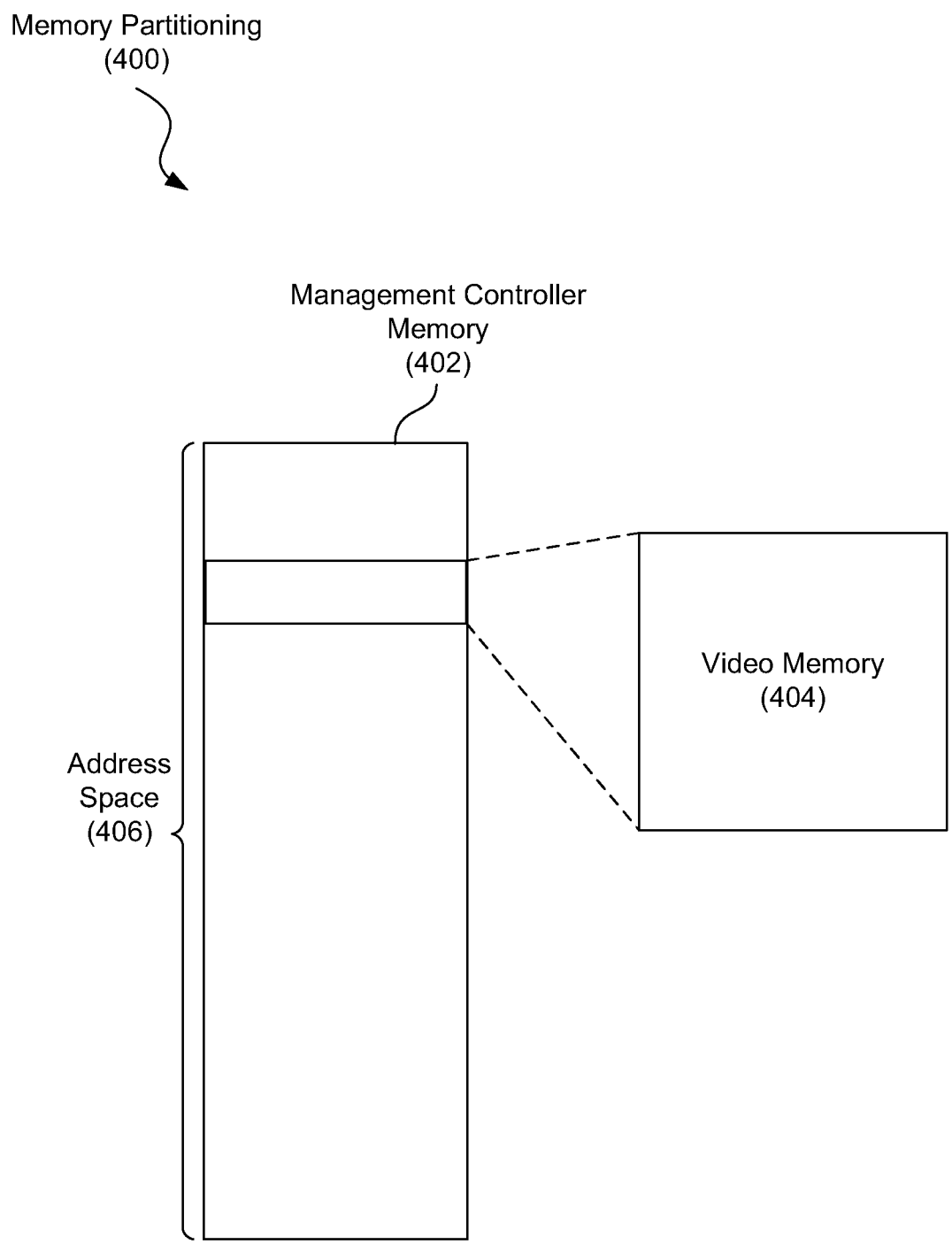
FIG. 4 is a diagram showing illustrative memory partitioning, according to one example of principles described herein.

FIG. 4 is a diagram showing illustrative memory partitioning (400). As mentioned above, the memory system of a management controller (e.g. 200, FIG. 2) may share memory (e.g. 214, FIG. 2) between the video controller (e.g. 206, FIG. 2) and other components of the management controller. The address space (406 of the management controller memory (402) can include a partition that is designated for video memory (404). This video memory (404) partition can be dedicated for use by the video controller. The amount of memory partitioned for the video controller may depend on the processing capabilities and needs of the video controller.

Figure 5:
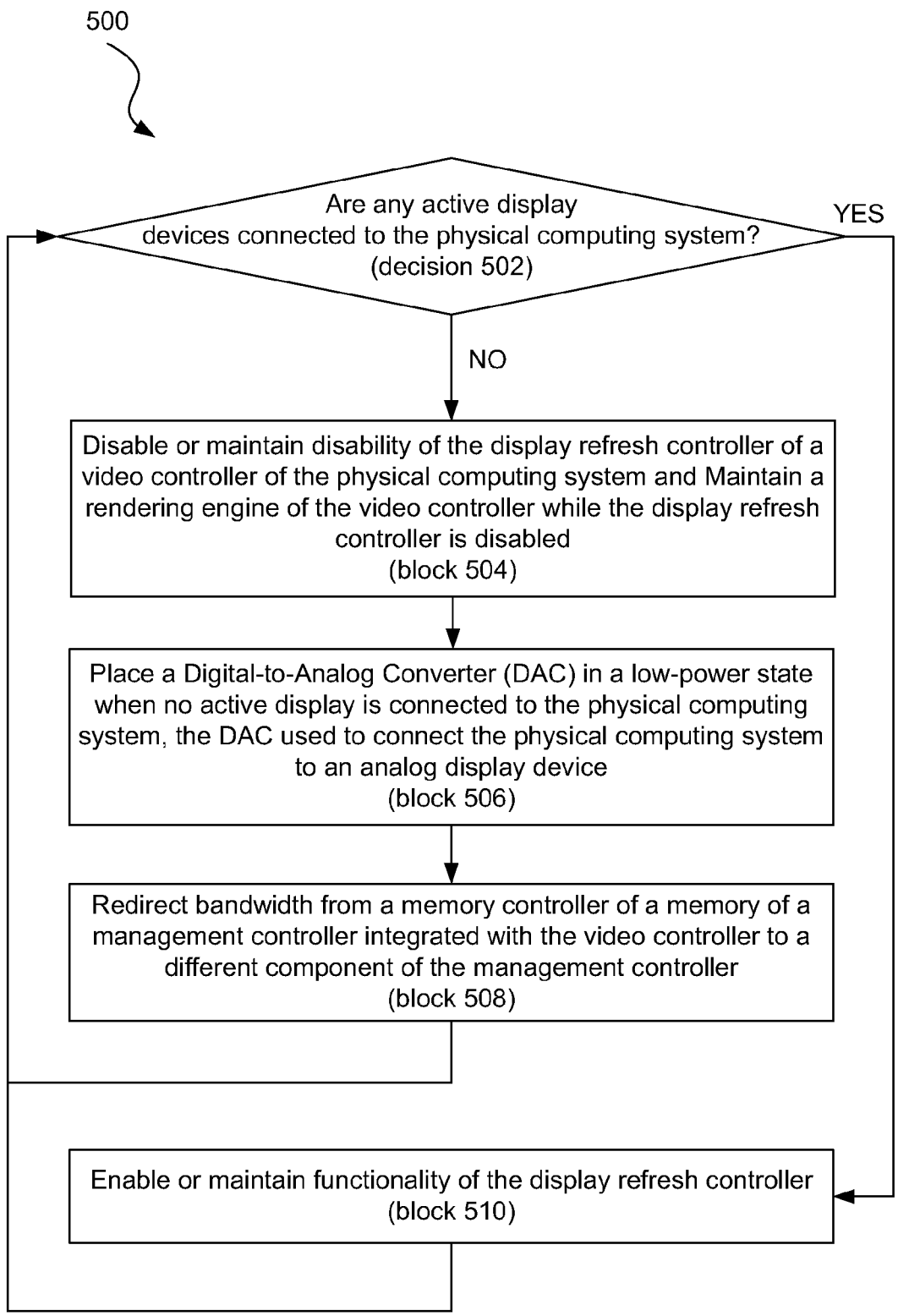
FIG. 5 is a flowchart showing an illustrative method for shutting down a display refresh controller, according to one example of principles described herein.

FIG. 5 is a flowchart showing an illustrative method (500) for shutting down a display refresh process of a video controller. According to certain illustrative examples, the method may start by determining (decision 502) if there are any active display devices connected to a physical computing system. If there are indeed (decision 502, YES) active display devices connected to the physical computing system, then the method (500) will continue by maintaining (block 510) functionality of the display refresh controller. The method may then again determine (decision 502 if there are any active display devices connected to the physical computing system.

If there are no (decision 502, NO active display devices connected to the physical computing system, then the method (500) will continue by disabling (block 504) the display refresh controller of a video controller of the physical computing system and maintaining a rendering engine of the video controller while the display refresh controller is disabled; placing (block 506) a Digital-to-Analog Converter (DAC) in a low-power state when no active display is connected to the physical computing system, the DAC used to connect said physical computing system to an analog display device; and redirecting (block 508) bandwidth from a memory controller of a memory of a management controller integrated with the video controller to a different component of the management controller. The method may then again determine (decision 502) if there are any active display devices connected to the physical computing system.

In sum, through use of a method or system embodying principles described herein, the display refresh process performed by the display refresh controller of a video controller can be shut down as opposed to shutting down the entire video controller. By shutting down a display refresh process, more memory bandwidth is available for other components using the same memory as the display refresh controller. Furthermore, the operation of the video controller can be readily continued when the display refresh process is once again enabled as a result of a display device being connected or made active. Shutting down the display refresh process also reduces the power consumption. Furthermore, no interaction with the operating system is required. Consequently, a system embodying principles described herein can be designed and implemented without regard to which operating system will be used. Additionally, no vendor specific; software is needed to perform the operations described herein.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A method performed by a physical computing system, the method comprising:
   determining that no display device is active;
   disabling, in response to the determining, a display refresh process performed by a video controller of the physical computing system by preventing scanning contents of a frame buffer; and
   maintaining a rendering engine of the video controller to generate rendered data that is placed into the frame buffer while the display refresh process is disabled.

2. The method of claim 1, in which the video controller shares a memory component with a different hardware device of the physical computing system.

3. The method of claim 2, in which the different hardware device is a management controller.

4. The method of claim 1, in which the physical computing system comprises a display controller to receive a presence signal from at least one display plug and route a video feed from the video controller to the at least one display plug, the video feed being received through one Digital-to-Analog Converter (DAC).

5. The method of claim 4, in which the display controller connected to the display plug comprises a de-bouncing circuit.

6. The method of claim 1, in which the display device is directly connected to the physical computing system or remotely connected to the physical computing system over a data network.

7. The method of claim 1, further comprising, placing a Digital-to-Analog Converter (DAC) in a low-power state when no active display is connected to the physical computing system, the DAC used to connect the physical computing system to an analog display device.

8. The method of claim 1, in which disabling the display refresh process further comprises completing all outstanding memory requests before shutting down.

9. The method of claim 1, further comprising, enabling the display refresh process when an active display device is detected by the physical computing system.

10. A physical computing system comprising:
   an integrated video controller comprising a rendering engine and a display refresh controller;
   a memory controller connected to a memory;
   a frame buffer to store rendered data; and
   a display controller to determine whether a display device that is active is connected to the physical computing system;
   in which a display refresh process is disabled, by preventing scanning contents of a frame buffer, when no active display device that is active is connected to the physical computing system while a rendering engine maintains functionality to generate the rendered data that is placed into the frame buffer while the display refresh process is disabled.

11. The system of claim 10, further comprising a display controller to receive a presence signal from at least one display plug and route a video feed from the video controller to the at least one display plug, the video feed being received through one Digital-to-Analog Converter (DAC).

12. The system of claim 11, in which the display controller comprises a de-bouncing circuit.

13. The system of claim 10, in which the display device is directly connected to the physical computing system or is remotely connected to said physical computing system over a data network.

14. The system of claim 10, in which the display refresh process is disabled in response to a shut down signal received by the video controller from the display controller.

15. The system of claim 10, in which a Digital-to-Analog Converter (DAC) is put into a low-power state when no active display is connected to the physical computing system, the DAC used to connect the physical computing system to an analog display device.

16. The system of claim 10, in which to disable the display refresh process, all outstanding memory requests are completed before the display refresh process is disabled.

17. The system of claim 10, in which the display refresh process is enabled when an active display device is detected by the physical computing system.

18. The system of claim 10, in which the display refresh process is enabled when an active display is connected to the physical computing system.

19. A method performed by a physical computing system comprising a video controller integrated with a management controller, the method comprising:
   determining whether an external display device is connected to the physical computing system;
   determining whether an external display device is inactive;
   determining whether an active internal display device is requesting display data from the physical computing system;
   receiving information indicating how images should be rendered for display on the external display device;
   when an external display device is connected and inactive, disabling a display refresh process performed by preventing scanning contents of a frame buffer when no display device that is active is connected to the physical computing system and no remote session is requesting display data from said physical computing system while a rendering engine of the video controller maintains functionality to generate rendered data that is placed into the frame buffer while the display refresh process is disabled; and
   redirecting bandwidth to other devices associated with the management controller.

* * * * *